United States Patent
Danilov et al.

(10) Patent No.: US 11,681,677 B2
(45) Date of Patent: Jun. 20, 2023

(54) GEOGRAPHICALLY DIVERSE DATA STORAGE SYSTEM EMPLOYING A REPLICATION TREE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 23 days.

(21) Appl. No.: 16/803,923

(22) Filed: Feb. 27, 2020

(65) Prior Publication Data

US 2021/0271655 A1    Sep. 2, 2021

(51) Int. Cl.
| | | |
|---|---|---|
| *G06F 16/30* | (2019.01) | |
| *G06F 16/22* | (2019.01) | |
| *G06F 16/27* | (2019.01) | |
| *G06F 16/18* | (2019.01) | |
| *G06F 16/182* | (2019.01) | |
| *G06F 16/2455* | (2019.01) | |

(52) U.S. Cl.
CPC ........ *G06F 16/2246* (2019.01); *G06F 16/182* (2019.01); *G06F 16/1858* (2019.01); *G06F 16/24564* (2019.01); *G06F 16/27* (2019.01)

(58) Field of Classification Search
CPC .... G06F 16/2246; G06F 16/27; G06F 16/182; G06F 16/185; G06F 16/24564
See application file for complete search history.

(56) References Cited

U.S. PATENT DOCUMENTS

| | | | |
|---|---|---|---|
| 9,390,120 B1* | 7/2016 | Gulliver | G06F 16/2365 |
| 2005/0050115 A1* | 3/2005 | Kekre | G06F 11/2071 |
| 2008/0240115 A1* | 10/2008 | Briscoe | H04L 45/02 |
| | | | 370/400 |
| 2009/0307336 A1* | 12/2009 | Hieb | H04W 56/002 |
| | | | 709/220 |

(Continued)

*Primary Examiner* — Khanh B Pham
(74) *Attorney, Agent, or Firm* — Amin, Turocy & Watson, LLP

(57) ABSTRACT

A geographically diverse data storage system that can protect data via replication of data among relevant zones according to a determined replication topology is disclosed. The replication topology can be determined based on replication times between the relevant zones. In an aspect, a tree topology can provide advantages over a star topography. In an embodiment, a tree topology can be generated, or an existing topology can be modified, via selection of a next replication task(s) based on the replication times. In an aspect, the replication times can be determined from measurable characteristics of the geographically diverse data storage system. In some embodiments, the replications times can be based on historical measurements, time limited historical measurements, inferences from machine learning, etc. A determined topology can be ranked relative to other viable topologies based on criteria such as speed, monetary cost, computing resource usage, etc. Accordingly, a selected topology, or selected modification to a topology, can provide for improved replication that can provide protection for data stored in the geographically diverse data storage system.

20 Claims, 10 Drawing Sheets

(56) References Cited

U.S. PATENT DOCUMENTS

2012/0203888 A1* 8/2012 Balakrishnan .......... G06F 9/505
  709/224
2017/0013058 A1* 1/2017 Annamalai ......... H04L 67/1095
2017/0085640 A1* 3/2017 Mandal ................. H04L 67/104
2017/0147672 A1* 5/2017 Arnold .................... H04L 67/10

* cited by examiner

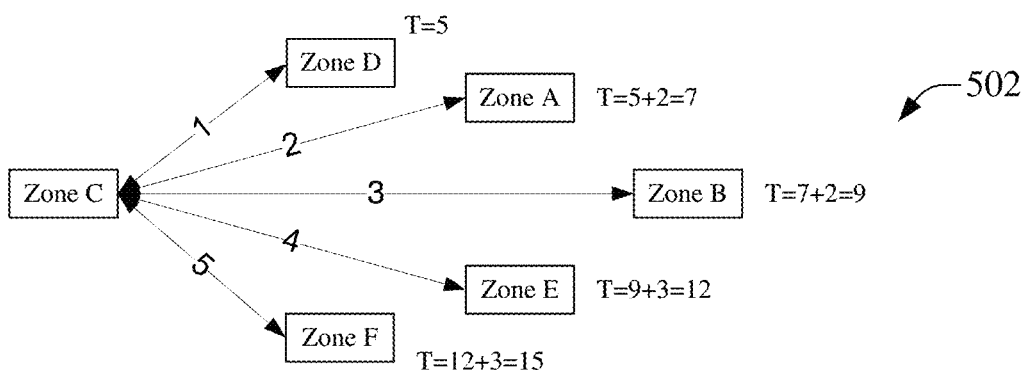
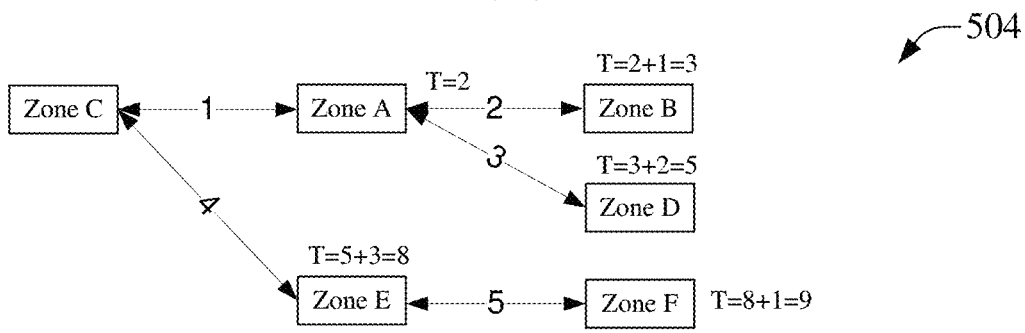
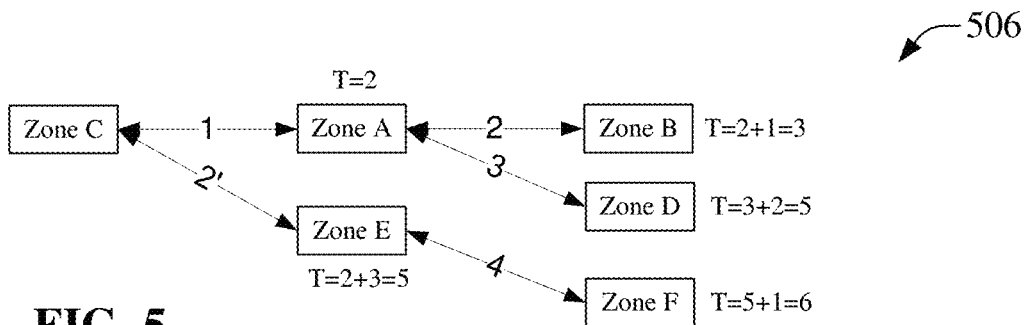
FIG. 5

| Scheme | Zone/Time | 1 | 2 | 3 | 4 | 5 | 6 | 7 | 8 | 9 | 10 | 11 |
|---|---|---|---|---|---|---|---|---|---|---|---|---|
| 1 | A | | C writes A | C writes A | | | | | | | | |
| 1 | B | | | | C writes B | C writes B | | | | | | |
| 1 | C | C writes D | C writes A | C writes A | C writes B | C writes B | C writes E | C writes E | C writes E | C writes F | C writes F | C writes F |
| 1 | D | C writes D | | | | | | | | | | |
| 1 | E | | | | | | C writes E | C writes E | C writes E | | | |
| 1 | F | | | | | | | | | C writes F | C writes F | C writes F |
| 2 | A | | C writes A | C writes A | A writes B | | | | | | | |
| 2 | B | | | | A writes B | | | | | | | |
| 2 | C | C writes D | C writes A | C writes A | | C writes E | C writes E | C writes E | | | | |
| 2 | D | C writes D | | | | | | | | | | |
| 2 | E | | | | | | | C writes E | E writes F | | | |
| 2 | F | | | | | | | | E writes F | | | |
| 3 | A | | C writes A | C writes A | A writes E | A writes E | A writes E | | | | | |
| 3 | B | | D writes B | D writes B | | | | | | | | |
| 3 | C | C writes D | C writes A | C writes A | C writes F | C writes F | C writes F | | | | | |
| 3 | D | C writes D | D writes B | D writes B | | | | | | | | |
| 3 | E | | | | A writes E | A writes E | A writes E | | | | | |
| 3 | F | | | | C writes F | C writes F | C writes F | | | | | |

FIG. 6

GEOGRAPHICALLY DIVERSE DATA STORAGE SYSTEM EMPLOYING A REPLICATION TREE

TECHNICAL FIELD

The disclosed subject matter relates to data storage and, more particularly, to data replication across remote zones of a geographically diverse storage system to provide data redundancy.

BACKGROUND

Conventional data storage techniques can replicate data in other locations to provide data redundancy. One use of data storage is in bulk data storage. Conventional use of a star topology for data replication can result in inefficient use of computing resources. Accordingly, adapting a data replication topology can be desirable.

BRIEF DESCRIPTION OF DRAWINGS

FIG. 5 is an illustration of example systems for storing replicated data in a geographically diverse storage system to illustrate alteration of the topologies in response to a change in a performance of the geographically diverse storage system, in accordance with aspects of the subject disclosure.

FIG. 6 illustrates example state changes of various topology schema for storing replicated data in a geographically diverse storage system, in accordance with aspects of the subject disclosure.

DETAILED DESCRIPTION

Figure 1:
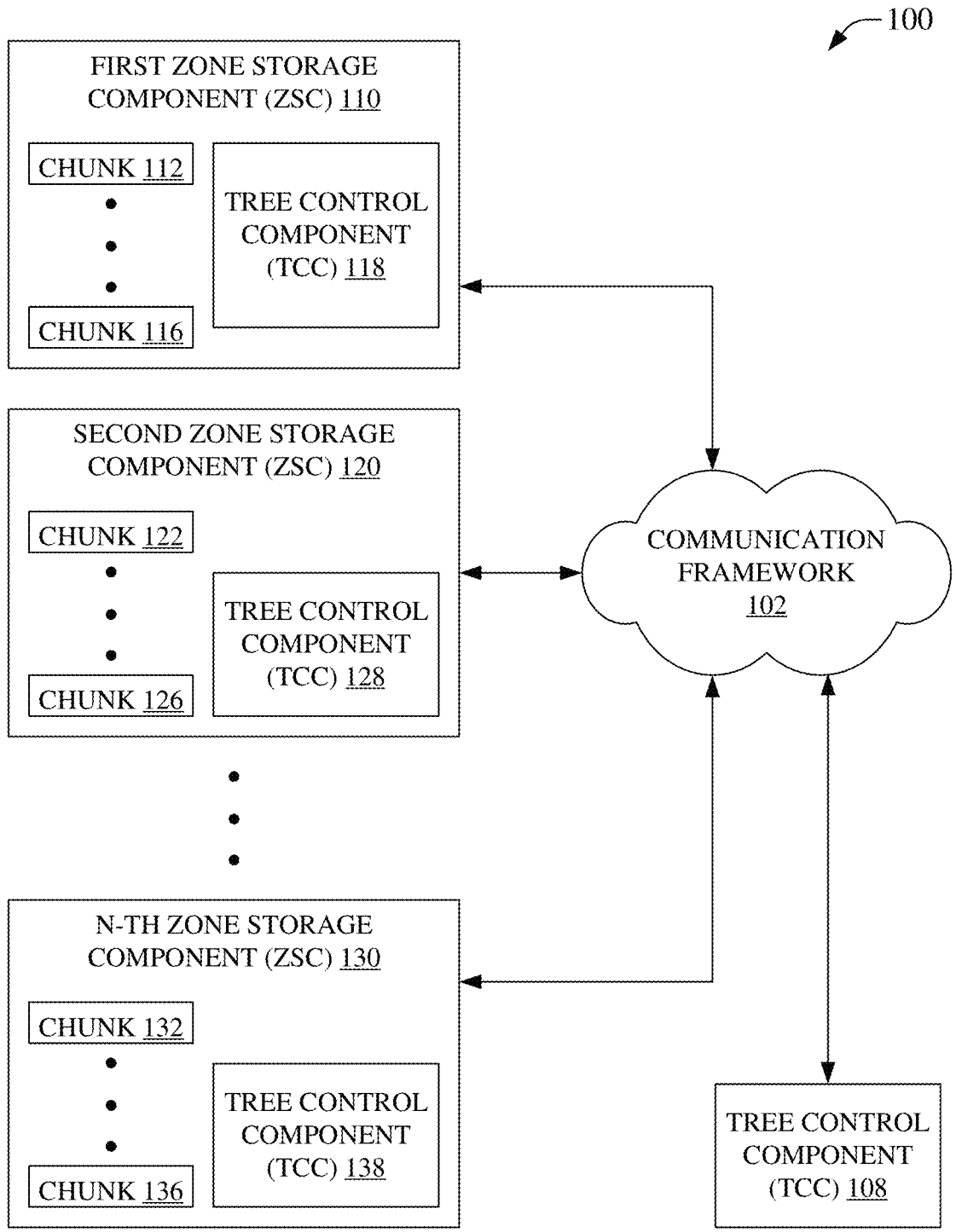
FIG. 1 is an illustration of an example system that can facilitate adapting a topology employed in replication of data among geographically diverse storage zones, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, one use of data storage is in bulk data storage. Examples of bulk data storage can include networked storage, e.g., cloud storage, for example ECS offered by Dell EMC, formerly known as Elastic Cloud Storage by Dell EMC. Bulk storage can, in an aspect, manage disk capacity via partitioning of disk space into blocks of fixed size, frequently referred to as data chunks, chunks, etc., for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk is determined to be 'full enough,' it can be sealed so that the data therein is generally not available for further modification, e.g., the chunk can be designated as immutable. These chunks can be then stored in a geographically diverse manner to allow for recovery of the data where a first copy of the data is destroyed, e.g., disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas data chunks. The convolved Boston chunk can consume less disk space than the sum of the separate Seattle and Dallas local chunks. As an example, "exclusive or" convolution, hereinafter 'XOR', '⊕', etc., can be employed to convolve the Seattle and Dallas chunks to form the Boston chunk, e.g., C=A1⊕B1, where A1 is a replica of the Seattle local chunk, B1 is a replica of the Dallas local chunk, and C is the convolution of A1 and B1. In some embodiments, a protection set can be distributed across zones of a geographically diverse storage system to provide ruggedness of stored data, e.g., an erasure coding (EC) of data can be used to determine a protection set that can facilitate recovery of protected data and the portions of the protection set can be stored in a diverse manner in a geographically diverse storage system to provide ruggedness. Of further note, the disclosed subject matter can further be employed in more or fewer zones, in zones that are the same or different than other zones, in zones that are more or less geographically diverse, etc. As an example, the disclosed subject matter, in some embodiments, can be applied to data of a single disk, memory, drive, data storage device, etc., without departing from the scope of the disclosure, e.g., the zones in some embodiments can represent different logical areas of the single disk, memory, drive, data storage device, etc. Moreover, it will be noted that convolved chunks can be further convolved with other data, e.g., D=C1⊕E1, etc., where E1 is a replica of, for example, a Miami local chunk, E, C1 is a replica of the Boston partial chunk, C, from the previous example and D is an XOR of C1 and E1 located, for example, in Fargo.

In an aspect, chunks in disparate geographic locations can provide for recovery of data. Continuing a previous example, the Fargo chunk, D, can be de-convolved into C1 and E1 based on either C1 or D1; the Miami chunk, C, can be de-convolved into A1 or B1 based on either A1 or B1; etc. Continuing another previous example, remaining portions of a protection set can be employed to recover other less accessible portions of the protection set, e.g., portions in Fargo, et al., can be used to recover less accessible portions in Miami, etc.

In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk. As such, there can be redundancy in a zone and other redundancy between zones.

Generally, replication of data, portions of a protection set, convolved chunks, etc., at other zones can be performed frequently in a geographically diverse data storage system and can consume significant computing resources, e.g., network resources, processor resources, memory resources, etc., in addition to other real world resource costs such as real-estate, power, staffing, maintenance, etc. Accordingly, it can be desirable to efficiently consume computing resources, to reduce a demand for real world resources, etc. In an aspect, where resources are unlimited, faster replication of data among zones can be enabled by simply adding more network resources, increasing available processors, expending more energy, etc. However, where resources are typically not unlimited, tasks can be performed serially within the resource constraints. Serially processed tasks can be slower than parallel processed tasks. One example of a serially processed task is a star topology for replication of data, e.g., where data is to be replicated from a first zone to five other zones, the first zone can first replicate data to a second zone, then to a third zone, then to a fourth zone, and finally to the fifth zone, one after the other rather than in parallel. A tree topology can outperform a star topology by taking advantage of differences in performance between pairs of zones that are not utilized by a typically star topology, as is disclosed herein below.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adapting a topology employed in replication of data among geographically diverse storage zones, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100, e.g., via communication framework 102, etc. A zone can correspond to a geographic location or region. As such, different zones can be associated with different geographic locations or regions, generally widely distributed to provide a distribution that can protect against all sorts of perils, e.g., political unrest, natural disaster, power grid failures, divergent costs of operation, etc. A ZSC can comprise one or more data stores in one or more locations. In an aspect, a ZSC can store at least part of a data chunk on at least part of one data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc. This zone can be distinct from a 'South American zone' that, for example, can comprise storage devices in Sao Paolo, Brazilia, etc.

In an aspect, data chunks, e.g., chunk 112 to chunk 116, 122 to 126, 132 to 136, etc., can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing intra-region data redundancy that can protect the data of the first chunk, for example, where a storage device storing the first chunk or a replicate thereof becomes compromised, the other replicates (or the first chunk itself) can remain uncompromised within the zone. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., e.g., communications framework 102, etc., to other data storage locations on the first, second, and third storage devices and, moreover, can consume data storage resources, e.g., drive space, etc., upon replication. Further, access, communication, etc., of chunks can consume or burden computing resources of one or more ZSCs, components of communication framework 102, etc., wherein computing resources can comprise processing of operations on one or more processors, use of one or more memories, use of one or more network resources, etc. As such, the number of replicates and/or storage schema can be based on balancing resource costs, e.g., network traffic, processing time, cost of storage space, etc., against a level of data redundancy, e.g., how much redundancy is needed to provide a level of confidence that the data/replicated data will be available.

In an aspect, system 100 can comprise one or more tree control component(s) (TCC), e.g., TCC 108, 118, 128, 138, etc. A TCC can enable adapting a topology for storing replicate data across zones of a geographically diverse storage system, typically via a tree topology. In an aspect, a star topology can also be selected as low level tree topology, e.g., as a tree with a root and all branches and no 'trunk'. In an aspect, a TCC can facilitate one or more topologies, schemes, etc., for example, a first protection set can employ a first replication data storage scheme and a second protection set can employ a second replication data storage scheme; a first set of zones can employ a first replication topology and a second set of zones can employ a second replication topology; etc. In an embodiment, a TCC can adapt a topology based on predicted performance of the geographically diverse storage system. As examples, historical data indicating a time to complete replication of an amount of data between a pair of zones of the geographically diverse storage system can be an indicator of future performance for storage of a data between zones of the pair, a contractual monetary cost of transferring data between zones can predict a cost of a future transfer between the zones; etc. In an aspect, the historical data can be, for example, an average time to store a replicate, a windowed time to store a replicate, a median time to store a replicate, an inferred time to store a replicate based on machine learning/artificial intelligence, etc.

In an embodiment, TCC 108 can interact with the ZSCs of system 100 via communication framework 102 to orchestrate replication of data within a ZSC, e.g., ZSC 110, 120, 130, etc., of system 100, e.g., TCC 108 can orchestrate selection, adaptation, generation, etc., of topology schemes to facilitate replication of data across a geographically diverse storage system that can provide data redundancy. In another embodiment, TCC 108 can orchestrate replication of data between ZSCs of system 100, while TCCs 118, 128, 138, etc., can each orchestrate replication of data within a corresponding ZSC, e.g., 110, 120, 130, etc. In an aspect, each of TCC 118, 128, or 138, etc., can perform the same or similar functions as TCC 108, e.g., even where system 100 does not include TCC 108, one or more of TCC 118, 128, 138, etc., can orchestrate selection of, adaptation of, generation of, etc., topology schemes to facilitate replication of data across a geographically diverse storage system that can provide data redundancy.

Figure 2:
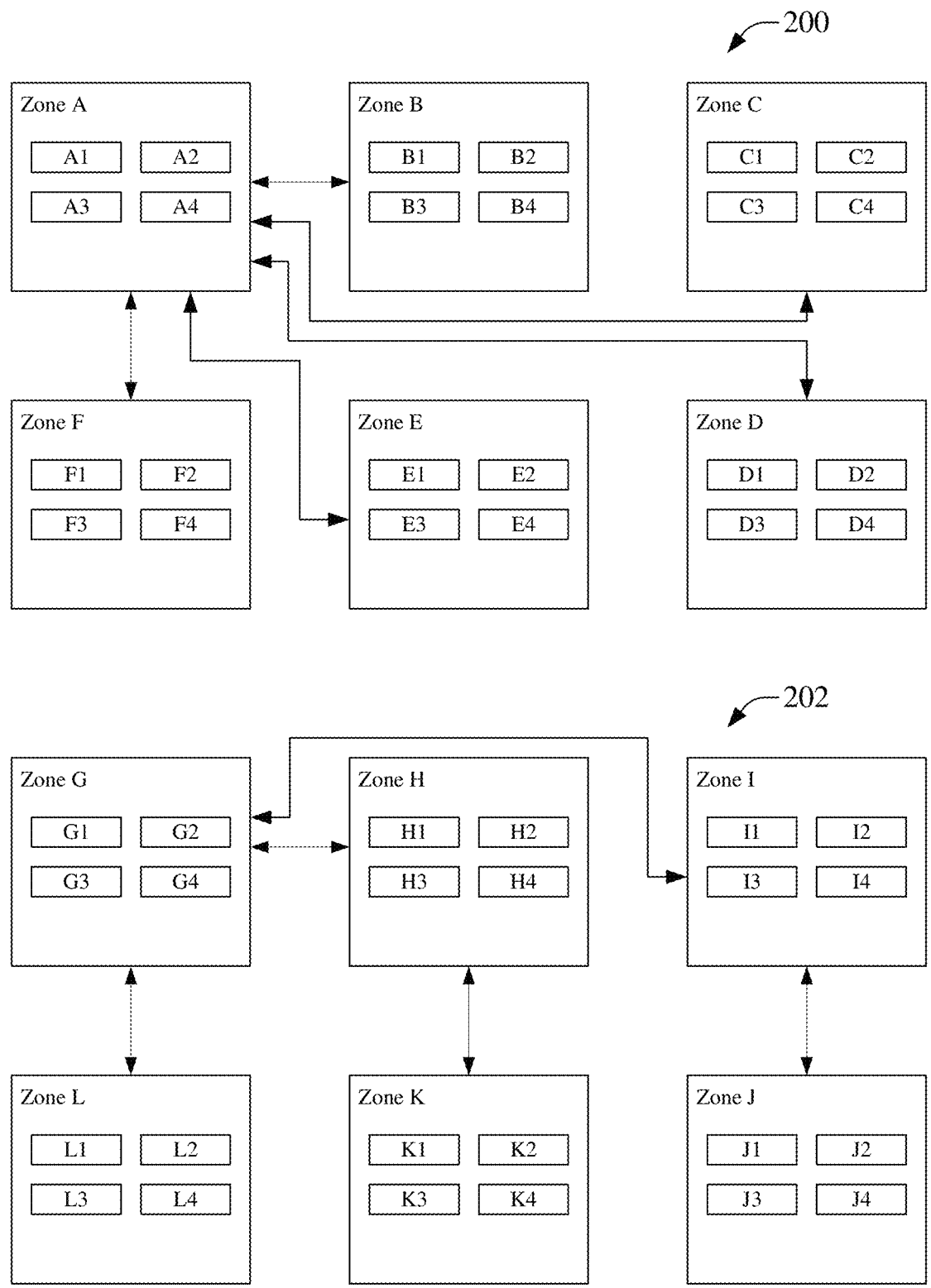
FIG. 2 is an illustration of example systems employing a star topology or a tree topology for replication of data among geographically diverse storage zones, in accordance with aspects of the subject disclosure.

FIG. 2 is an illustration of systems 200 and 202, which can enable different topologies for replication of data among geographically diverse storage zones, in accordance with aspects of the subject disclosure. System 200 can illustrate a GEO comprising zones A-F, e.g., six zones, employing a star topology for chunk replication. System 202 can illustrate a GEO comprising zones G-L, e.g., six zones, employing a tree topology for chunk replication. Each of the zones in systems 200 and 202 can store data chunks, e.g., Zone A can store chunks A1-A4, etc. Moreover, each of the zones can store other chunks, for example, replicates of chunks from other zones, e.g., Zone B at can store chunks B1, B2, B3, B4, etc., which can correspondingly be replicates of A1, A2, A3, A4, etc., from zone A. In an aspect, each zone can store data chunk and/or coding chunks, e.g., as can be generated via an erasure coding protection scheme. In an aspect, each zone can store a convolved chunk, e.g., as can be generated via a data convolution protection scheme.

As illustrated in example system 200, a star topology can replicate data from a first zone to other zones to provide data redundancy. As is noted hereinabove, this can be a serial process, for example, first replicating A1-A4 from Zone A as B1-B4 in Zone B, then replicating A1-A4 from Zone A as C1-C4 in Zone C, then replicating A1-A4 from Zone A as D1-D4 in Zone D, . . . , etc. In an embodiment, zones A and F can be in a first region that is distant from a second region comprising zones B and E, that can also be distant from a third region comprising zones C and D, for example, the first region can be the USA, the second region can be South America, and the third region can be Europe. As such, in this example, the transit times of data between the regions can be a more significant portion of replication time than would generally be associated with data transit times within any of the three regions, e.g., it can take longer to send data between the U.S.A. and Europe than would generally be expected for transferring the same data between Seattle and Boston, between Paris and Berlin, etc. However, the star topology does not leverage the differences in replication time between zones. Rather, the star topology simply chugs through replication from a root zone, e.g., Zone A, to every other leaf zone, e.g., each of zones B-F.

In contrast, a tree topology can take advantage of differences in replication times between zones that are ignored in a star topology. As an example, where intra-region replication times can be faster than inter-region replication times, it can, for example, be faster to replicate inter-region twice in system 202, e.g., first between zone G and zone H and second between zone G and zone I, and then replicate intra-region, e.g., zone G to zone L, zone H to zone K, and zone I to zone J, than it would be to use a star topology that can comprise four inter-region replications and only one intra-region replication. In an aspect, replication time can comprise network transfer time, processing time, reading/writing time, etc. In some embodiments, replication time between a zone pair can be affected by a speed/jitter/bandwidth/etc. of a network between the zones, a network path between zones, a software/hardware compatibility between the zones, etc. As an example, a first zone of the pair can employ recently updated firmware and a second zone of the pair can still operate on a previous version of the firmware causing communication between the two zones of the pair to be slower than between the first zone and a third zone that is also employing the updated firmware. As another example, replication between zones in different time zones can be affected by the standard work day, e.g., it can be the star t of the workday in Moscow, e.g., greater demand on computing resources slowing replication times into Moscow, and be the middle of the night in Seattle, e.g., lower demand on computing resources accelerating replications times into Seattle. As a further example, some communication links between zones of a pair can traverse elements that limit the bandwidth, speed, jitter, error rate, etc., which can alter replication times. Moreover, distance between zones can alter replications times, e.g., it can take longer to communicate data for replication across greater distances. As such, leveraging the differences in replication times can affect how well replication can be performed, e.g., system 200 can take longer to perform replication of the same data from zone A to the other zones than it can take in system 202, even where, for example, system 200 and 202 can be otherwise identical, based on the tree replication topology performing replication according to a different topology than that of system 200.

Figure 3:
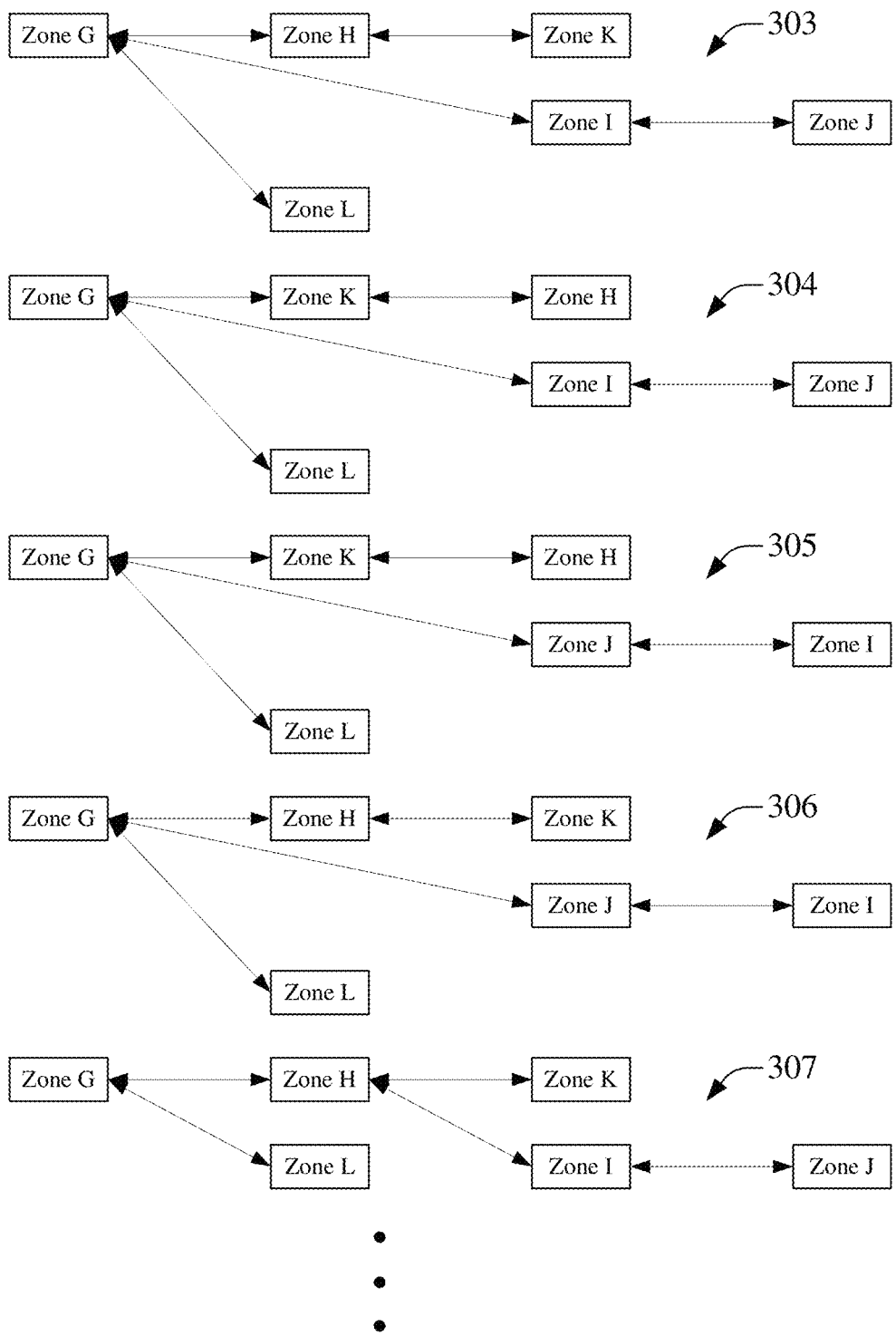
FIG. 3 illustrates example systems employing permutations of tree topologies for storing replicated data in a geographically diverse storage system, in accordance with aspects of the subject disclosure.

FIG. 3 illustrates example systems 303-307 using permutations of tree topologies for storing replicated data in a geographically diverse storage system, in accordance with aspects of the subject disclosure. In an aspect, system 303 can be the same as, or similar to, system 202 of FIG. 2. System 303 illustrates a tree topology/scheme wherein zone G can perform replication to zones H, I, and L, then zone H can perform replication to zone K, and zone I can then perform replication to zone J. This tree topology is distinct from a star topology that can perform replication from zone G to each of H to L, see system 200 of FIG. 2, etc.

System 303, can comprise six zones in three regions, e.g., zones G and L can be in a first region, zone H and K can be in a second region, and zones I and J can be in a third region. Where replication times between regions can be greater than replication times between zones of a same region, it can be shown that tree topology systems 303-307 can offer similar benefits over a star topology. As an example, system 303 can comprise two inter-region replications, e.g., G→H and G→I, and three intra-region replications, e.g., G→L, H→K and I→J. This can be less than the four inter-region and one intra-region replications of a star topology. Similarly, system 304 can comprise two inter-region replications, e.g., G→K and G→I, and three intra-region replications, e.g., G→L, K→H and I→J; system 305 comprise two inter-region replications, e.g., G→K and G→J, and three intra-region replications, e.g., G→L, K→H and J→I; and system 306 comprise two inter-region replications, e.g., G→H and G→J, and three intra-region replications, e.g., G→L, H→K and J→I.

Similarly, system 307 can comprise two inter-region replications, e.g., G→H and H→I, and three intra-region replications, e.g., G→L, H→K and I→J. Accordingly, each of tree topology systems 303-307 can comprise fewer inter-region transfers than the example star topology for replication of data from zone G to each of zones H-L. This can be beneficial to data reproduction in that, for example, tree topology reproduction of data for data protection can consume fewer computing resources than a star topology reproduction scheme. As an example, where each inter-region reproduction action can consume two units of time and each intra-region reproduction action can consume one unit of time, then the example star topology can consume nine units of time for the four inter-region and one intra-region reproduction and systems 303-307 can consume seven units of time for the two inter-region and three intra-region replications, e.g., shorter periods of time can reflect less use of a network connection, fewer operations on a processor, etc. It is further noted that other permutations are readily appreciated and are all considered within the scope of the instant disclosure even where not explicitly recited for the sake of clarity and brevity, e.g., another permutation can be based on system 307 where zone I and J are inverted such that this further example can comprise G→H and H→J, G→L, H→K and J→I.

Figure 4:
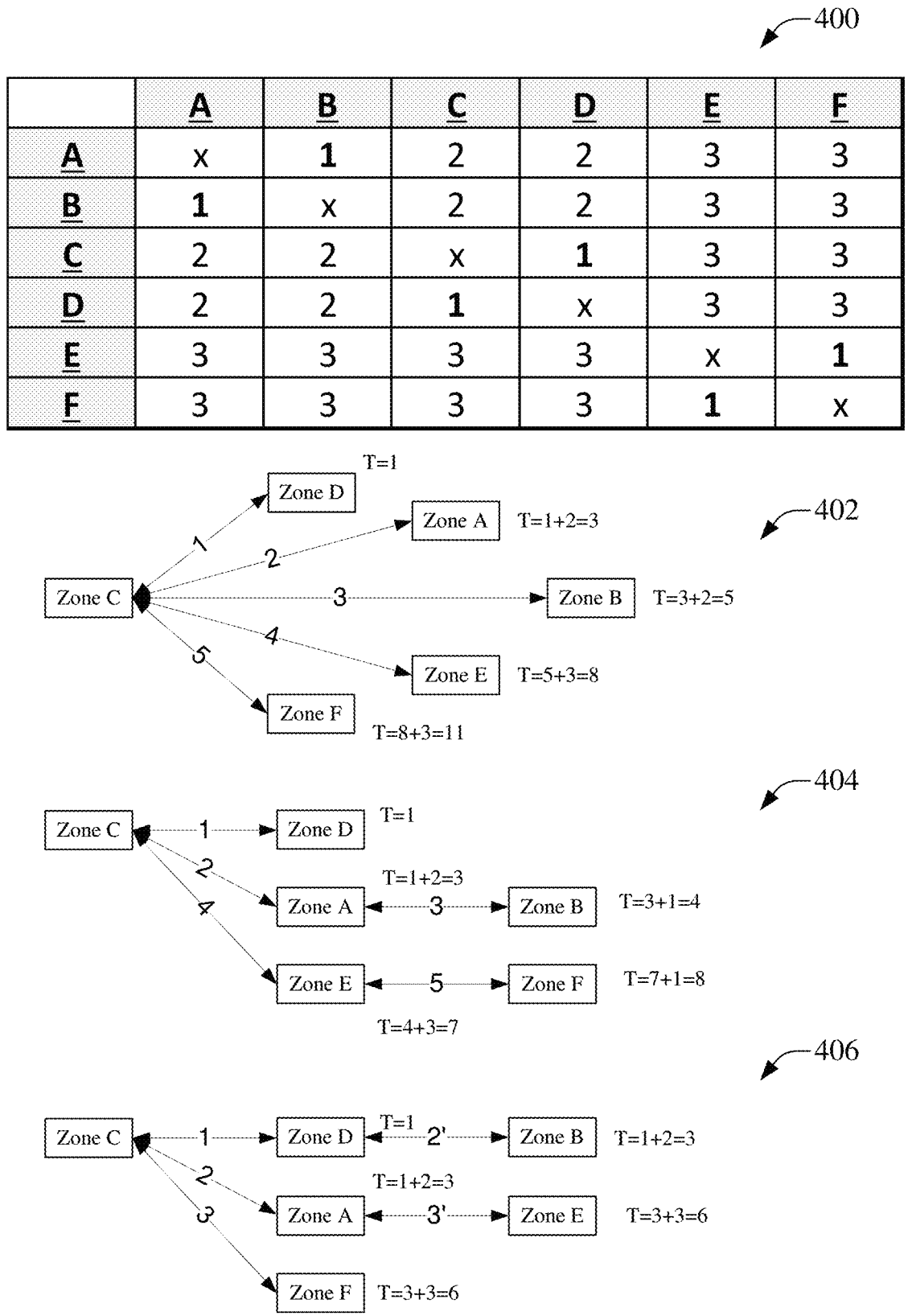
FIG. 4 is an illustration of example systems for storing replicated data in a geographically diverse storage system to illustrate differences in performance of different topologies, in accordance with aspects of the subject disclosure.

FIG. 4 is an illustration of example systems 402-406 for storing replicated data in a geographically diverse storage system to illustrate differences in performance of different topologies, in accordance with aspects of the subject disclosure. Table 400 can illustrate replication times between zone pairs comprised in a geographically diverse storage system. As an example, in table 400, a replication time between zone C and A can be two units, between zones D and E can be 3 units, etc. As is illustrated, there is no time listed, e.g., 'x' indicates no value, for replication between a zone and itself in table 400. In an aspect, replication time can include network transfer time, which can include retransmits and other error correction techniques, processing time, read/write access times, etc., involved in replicating data between the listed pairs of zones. In an embodiment, all else being equal, the replication time can reflect a distance between zones of a pair, e.g., the farther apart two zone, typically the longer the time to communicate data between the two zones, more especially where the longer communication paths can comprise multiple hops, longer distances, amplification stages, even uplink/downlinks to/from satellite(s), etc. As an example, given identical systems and conditions in zone A in Seattle, Wash., zone B in Portland, Oreg., and zone C in Capetown, South Africa, the time to replicate data between A and B can be expected to typically be less than between A and C or between B and C primarily due to the more torturous routing of data between C and either A or B as compared to that between A and B.

System 402, can illustrate a star topology for reference. In system 402, the time to complete the replication from zone C to the rest of the example zones can be 11 units. System 402 can consume one unit to replicate to zone D, then use two more units to replicate to zone A, such that zone A is completed after the time for D and A. Subsequently, in system 402, replication to zone B can consume two additional units, so that system 402 is now at five consumed units. Replication to zone E can consume three more units and replication to zone F can consume an additional three units, leaving system 402 consuming 11 units to complete the replications illustrated by arrows 1-5 of system 402.

System 404 can illustrate a first tree topology scheme for replication. In system 404, each replication follows the previous replication. As such, replication from zone C to D can consume 1 unit as indicated by arrow 1 of system 404, which can be the same as in system 402. At arrow 2 of system 404, zone C can replicate to zone A over two units. Zone A can then replicate to zone B over one additional unit as indicated by arrow 3. At this point, system 404 is at four units of time. Subsequently, at arrow 4, zone C can replicate to zone E over three units, putting system 404 at seven units. Next, at arrow 5, zone E can replicate to zone F for an additional unit. Accordingly, system 404 can complete the replication in eight units of time. This can be an improvement over system 402 at 11 units of time.

In an aspect, system 404 can be understood to follow an example technique, that starts with the 'root', here zone C, of a 'tree set', presently [C], and then determines which zone will offer the shortest replication time, here zone C→D offers a one unit time in comparison to two units for C→A or B and three units for C→E or F. As such, C→D can be selected. D can be added to the 'tree set' which can now be [C, D]. The next replication can be selected to occur from the 'root' C or from the 'branch' D based on the next shortest replications time, e.g., C→A (2 units), C→B (2 units), D→A (2 units), and D→B (2 units). Whereas all of these choices offer the same replication time, the selection can be arbitrary. In an aspect, the arbitrary selection can be substituted with selecting to keep the replication tree short, e.g., more branches from the root rather than adding branches to existing branches. As such, in this example, C→A can be selected from among C→A and C→B that are both new branches off the root C, see arrow 2 of system 404. Accordingly C can be added to the tree set, now at [C, D, A]. The Technique can then advance to select a next shortest replication time, e.g., among A→B (1 unit), A→E (3 units), A→F (3 units), D→B (2 units), D→E (3 units), D→F (3 units), C→B (2 units), C→E (3 units), and C→F (3 units). This leads to selection of A→B as illustrates in system 404 by arrow 3. Accordingly, B is added to the tree set, now at

[C, D, A, B]. This leaves replication to E and F, which is 3 units from each of C, D, A, or B. Accordingly, again for example to keep the tree short, C→E can be selected as indicated at arrow 4. The technique can now add zone E to the tree set, resulting in [C, D, A, B, E]. Where E→F is one unit and any of C-, D-, A-, or B-→F is three units, E→F is selected as shown at arrow 5 of system 404, leaving the final tree set as [C, D, A, B, E, F] and a total replication time of eight units.

System 406 can be understood to follow another example technique. System 406 can differ from system 404 and the associated technique thereof in that system 406 and the associated technique can perform replications from tree set members, e.g., more than one branch can be added to a tree set in a same period. The technique illustrated at system 406 can again start with the 'root', here zone C, of a 'tree set', presently [C], and then determines which zone will offer the shortest replication time, here zone C→D offers a one unit time in comparison to two units for C→A or B and three units for C→E or F. Moreover, as there is only the root in the tree set, only one action can be performed. As such, C→D can be selected. D can be added to the 'tree set' which can now be [C, D]. The next replication can be selected to occur from the 'root' C and/or from the 'branch' D based on the next shortest replication time(s), e.g., C→A (2 units), C→B (2 units), D→A (2 units), and D→B (2 units). Whereas all of these choices offer the same replication time, the selection can again be arbitrary as in system 404. Additionally, one branch can be added to C and one branch can be added to D in the same period, unlike in system 404. As such, in this example, C→A can be selected from among C→A and C→B to add to the root C, see arrow 2 of system 406. Similarly, in the same period, D→B can be added to branch D as indicated by arrow 2', based on zone A already being added via arrow 2 and thereby obviating selection of D→A. This leaves the tree set as [C, D, A, B] after three time units. The next shortest replication time, e.g., among A→E (3 units), A→F (3 units), D→E (3 units), D→F (3 units), C→E (3 units), and C→F (3 units) can leads to selection of C→F as illustrates in system 406 by arrow 3 based on keeping the tree short and all replications times being similar. However, also during this period, another branch can be added to each of zones D, B, or A, although the only remaining branch to add is to zone E. Accordingly, A→E can be selected, see arrow 3', to keep the tree short, e.g., adding B→E would take the same time but would result in a taller tree. In an aspect, D→E could just as easily have been selected to keep the tree short and the replication time low. System 406 can leave the final tree set as [C, D, A, B, F, E] and a total replication time of six units, owing to adding multiple branches in a same period to elements of the tree set. In an aspect, this can be understood to be possible where a member of the tree set has had data replicated into that zone and it is therefore possible to replicate it to another zone, see FIG. 6 to better see the timing of replications according to different replication schemes.

FIG. 5 is an illustration of example systems 502-506 for storing replicated data in a geographically diverse storage system to illustrate alteration of the topologies in response to a change in a performance of the geographically diverse storage system, in accordance with aspects of the subject disclosure. Table 500 can be the same as, or similar to Table 400, other than a change to a replication time between zones D and C, as is indicated in Table 500 by the '*5*' value that replaces the corresponding '1' value of Table 400.

As before, table 500, like table 400, can illustrate replication times between zone pairs comprised in a geographically diverse storage system. As is illustrated, there is no time listed, e.g., 'x' indicates no value, for replication between a zone and itself in table 500. System 502, can illustrate a star topology for reference. In system 502, the time to complete the replication from zone C to the rest of the example zones can be 15 units, now including the additional time for C→A.

System 504 can illustrate a first tree topology scheme for replication. In system 504, as in system 404, each replication follows the previous replication but does not add multiple branches to the tree set. As such, replication from zone C to A can consume 2 units as indicated by arrow 1 of system 504, which can be the same as in system 502. At arrow 2 of system 504, zone A can replicate to zone B over one additional unit based on selection of a lowest value from table 500 for adding a branch to either C or A, e.g., from among C→B, C→D, C→E, C→F, A→B, A→D, A→E, and A→F. At arrow 3 of system 504, zone A can replicate to zone D over two additional units based on selection of a lowest value from table 500 for adding a branch to one of C, A, or B, e.g., from among C→D, C→E, C→F, A→D, A→E, A→F, B→D, B→E, and B→F. It is noted that A→D and B→D each use two units but that selection of A→D keeps the tree shorter. The tree set can now be [C, A, B, D]. At arrow 4 of system 504, zone C can replicate to zone E over three additional units based on selection of a lowest value from table 500 for adding a branch to one of C, A, B, or D, e.g., from among C→E, C→F, A→E, A→F, B→E, B→F, D→E, and D→F. It is noted that all of these choices consume three units but that selection of C→E or C→F keeps the tree shorter, and here, C→E is arbitrarily selected over C→F. The tree set can now be [C, A, B, D, E]. At arrow 5 of system 504, zone E can replicate to zone F over one additional unit based on selection of a lowest value from table 500 for adding a branch to one of C, A, B, D, or E, e.g., from among C→F, A→F, B→F, D→F, and E→F. The tree set can now be [C, A, B, D, E, F] and the total time to completion can be 9 units. This time can be substantially shorter than the star topology, in part because of the tree topology, but also because the lengthy time to replicate between C and D is avoided by causing D to be replicated from A which is much faster, e.g., 2 units vs 5 units.

System 506 can be understood to follow another example technique. System 506 can differ from system 504 and the associated technique thereof in that system 506 and the associated technique can perform replications from tree set members, e.g., more than one branch can be added to a tree set in a same period. The technique illustrated at system 506 can again start with the 'root', here zone C, of a 'tree set', presently [C], and then determines which zone will offer the shortest replication time, here zone C→A offers the same advantages as seen in system 504 and can be selected for system 506 for similar reasons. A can be added to the 'tree set' which can now be [C, A]. The next replication can be selected to occur from the 'root' C and/or from the 'branch' A based on the next shortest replication time(s), e.g., C→B (2 units), C→D (5 units), C→E or F (2 units), A→B (1 units), A→D (2 units), A→E or F (3 units). As such, A→B can be selected, as indicated at arrow 2 of system 506, which can consume an additional 1 unit. Additionally, one branch can be added to A and one branch can be added to C in the same period, unlike in system 504. As such, in this example, C→E can be selected from among C→D (5 units), C→E or F (2 units). This can be illustrated at arrow 2' of system 506. Moreover, whereas A→B is complete before C→E completes, A can add an additional branch rather than sit idle. Whereas the tree set is now [C, A, B, E], replication to D or F can occur from zone A or B, wherein A→D (2 units), A→F (3 units), B→D (2 units), and B→F (3 units). This can lead to adding branch A→D at arrow 3, as it can lead to a shorter tree than adding similar replication time branch B→D. Accordingly, after five units, the tree set can be [C, A, B, E, D]. At arrow 4, replication to the last zone, e.g., zone F, can be added from zone E based on the shortest replication time, e.g., E→F (1 unit). System 506 can leave the final tree set as [C, A, B, E, D, F] and a total replication time of six units, owing to adding multiple branches in a same period to elements of the tree set. In an aspect, this can be understood to be possible where a member of the tree set has had data replicated into that zone and it is therefore possible to replicate it to another zone. System 506 can complete the replication process in less time than system 504 that is already a substantial time saver over system 502.

In an aspect, determining a change to a topology for replication of data among zones comprised in a geographically diverse storage system can be based on an expected or predicted replication time among pairs of zones. Historical information can be used to predict, infer, etc., a replication time to enable selection, modification, adapting of, generating, etc., a topology to facilitate the replication of data. This historical information can comprise historical network information, e.g., bandwidth, jitter, latency, etc., historical measurements of hardware/software at a zone, e.g., time consumed by a hardware/software of a zone time to complete a replication, etc., other costs, e.g., monetary costs, energy costs, maintenance costs, etc., associated with supporting replication of data between nodes, for example, some nodes may comprise out of date hardware/software and perform poorly thereby raising the weight of their score in tables such as 400, 500, etc., which can allow modification of a topology, e.g., via TCC components such as TCC 108-138, to work around these nodes, etc.

Additionally, in an aspect, it can be desirable to update a topology where characteristics of a geographically diverse storage system traverse a threshold value, e.g., small changes to the performance of replications can be insufficient to necessitate re-computing/adjusting a topology, while larger changes to replication performance can favor adapting a topology. This thresholding can avoid expending computing resources to update topologies unless the threshold value is traversed. As an example, normal fluctuations in network performance between a pair of nodes could cause nearly continuous adaption of topologies and, by setting a triggering threshold value outside the normal levels of fluctuation, the adaptation of the topology can be triggered after the example network departs from the range of normal fluctuation, thereby reducing the burden of frequent calculation of alternate topologies. Moreover, the historical data can represent values for all history, windows of history, etc. Historical data can additionally be employed as a training set for machine learning, artificial intelligence, Bayesian, etc., techniques that can infer a future performance of pairs in a geographically diverse data storage system. Further, customer tolerances can be incorporated, e.g., via a TCC, etc., into selection of an appropriate topology adaptation, for example, a customer can indicate that reproduction should occur in less than ten units of time, such that the topology of system 502 would be unsatisfactory and can trigger computation of an alternate topology by a TCC. In this example, where system 504 is under the 10 unit customer imposed threshold, further computation of system 506 can be extraneous and resources need not be expended to compute the topology of system 506 where system 504 is otherwise satisfactory. Where multiple alternate topologies, or adaptation permutations of a topology, are feasible, these variants can be ranked according to numerous criteria to facilitate selection of a preferred variant by a TCC. As an example, a first variant and a second variant of a topology adaptation can offer similar levels of performance for replication, but the second example variant can employ a private network link, for example, a pay-by-use of a constellation of private satellites, that can increase the monetary cost of selecting the second variant, in which case the second variant can be ranked lower than the first variant. Numerous other examples are readily appreciated and are within the scope of the current disclosure even where not recited for the sake of clarity and brevity.

In an aspect, the replication topology scheme can be communicated among the involved zones. As an example, TCC 118 can communicate a selected topology change to TCC 128, 138, etc. This can enable the other zones to properly replicate data according to the selected topology. This can include queueing of replication tasks at the several involved zones. As an example, in system 506, zone C can communicate the topology of system 506 to zones A, B, D, E, and F, such that, for example, zone A can replicate to zone B once zone A has performed replication from zone C, etc. In an aspect, messages and/or information related to selection of a topology scheme, determining a scheme, etc., can be communicated in dedicated messages between zones/TCCs, as part of other standard messages between zones, for example, in status messages, keep-alive messages, journal messages common to convolution of data chunks, etc., or via other types of communication. As an example, where a zone sends a status message to other zones to indicate that it is active, this status message can include information indicating an average of recent replications, indicating planned maintenance, indicating periods of high/low expected workload, etc.

FIG. 6 illustrates example state changes 600 of various topology schema for storing replicated data in a geographically diverse storage system, in accordance with aspects of the subject disclosure. Table 600 can illustrate state changes, e.g., actions occurring at different zones over time according to different replication schema. Table 600 covers up to 11 units of time for replication of data from zone C to each of zones B-F. Table 600 can reflect the example times illustrated in table 400 of FIG. 4 and scheme 1 can reflect the states of system 402, scheme 2 can reflect the states of system 404, and scheme 3 can reflect the states of system 406.

Scheme 1 at time 1 can replicate data from zone C to D, this is reflected by 'C writes D' occupying scheme 1 at C and D for time 1, which reflects arrow 1 of system 402. Similarly, at time 2-3, matching arrow 2 of system 402, 'C writes A' occupies scheme 1 at C and A for both time 2 and 3 because this takes 2 units of time as indicated in table 400. At times 4-5, 'C writes B' occupies scheme 1 at C and B for both time 4 and 5 because this takes 2 units of time as indicated in table 400 and reflected at arrow 3 of system 402. Accordingly, 'C writes E' and 'C writes F' each consume 3 units from table 400, and are illustrated in table 600 from times 6-8 and 9-11 correspondingly for their involved zones, which reflect arrows 4 and 5 of system 402. As such, scheme 1 can be understood to consume 11 units of time for the example replication, reflects the star topology of system 402, and corresponds to the data of related table 400 of FIG. 4.

Scheme 2 can reflect system 404 of FIG. 4. Accordingly, in time 1 of table 600, for scheme 2, 'C writes D' in the related zones, reflecting arrow 1 of system 404. At times 2-3, 'C writes A' in the related zones, reflecting arrow 2 of system 404. At time 4, 'C writes B,' reflecting arrow 3 of system 404. At times 5-7, 'C writes E', reflecting arrow 4 of system 404. At time 8, 'E writes F,' reflecting arrow 5 of system 404. As can be seen in table 600, scheme 2, a tree topology, completes faster than the star topology of scheme 1. Moreover, scheme 2, like system 404, does not perform parallel replications from members of a tree set at a given time, resulting in only one replication occurring between some two zones of the geographically diverse storage system at any given time. However, this can be understood to leave zones in the tree set idle. Accordingly, these idle times can be used to replicate to further zones and to complete the tree set more efficiently, e.g., there is less white space in table 600 for scheme 3 than for scheme 2, indicating that more available zones, e.g., zones that have been added to the tree set, are participating in replication in scheme 3 at any given time than in scheme 2.

Scheme 3 can reflect system 406 of FIG. 4. Accordingly, in time 1 of table 600, for scheme 3, 'C writes D' in the related zones, reflecting arrow 1 of system 406. At times 2-3, both 'C writes A' and 'D writes B' occur in the related zones, reflecting arrows 2 and 2' of system 406. This is an instance of zone D, after being added at arrow 1 of system 406, being able to participate in replication at the same time as other three set members, e.g., at this time zone C. Accordingly, at the end of time 3, the tree set can be [C, D, A, B]. At times 4-6, 'C writes F,' reflecting arrow 3 of system 406 and in the same times, 'A writes E', reflecting arrow 3' of system 406. The tree set can now be [C, D, A, B, F, E] and the replication can be completed in six units, which is faster than either scheme 1 or scheme 2. As can be seen in table 600, scheme 3 can employ otherwise idle members of the tree set to perform replications. This can, in some embodiments, provide an advantage over scheme 2.

Figure 7:
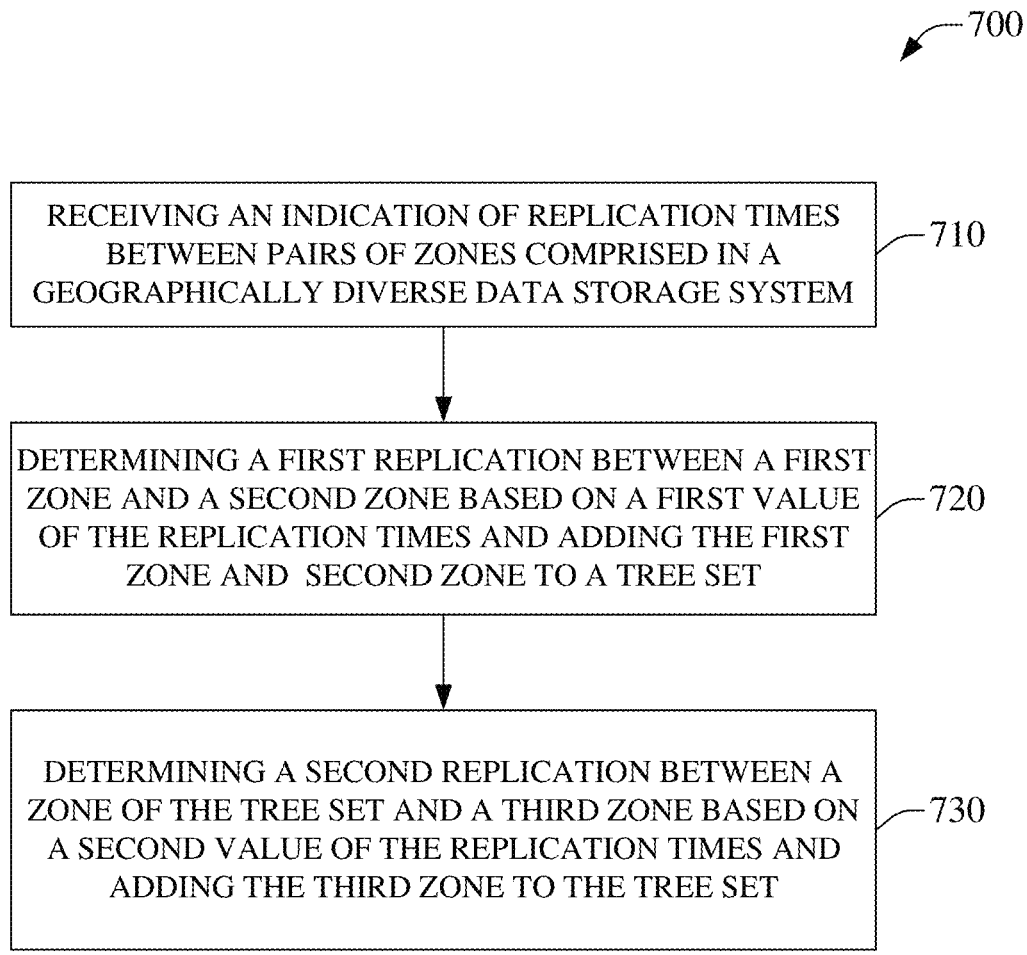
FIG. 7 is an illustration of an example method facilitating determining a tree topology for storing replicated data in a geographically diverse storage system, in accordance with aspects of the subject disclosure.
Figure 8:
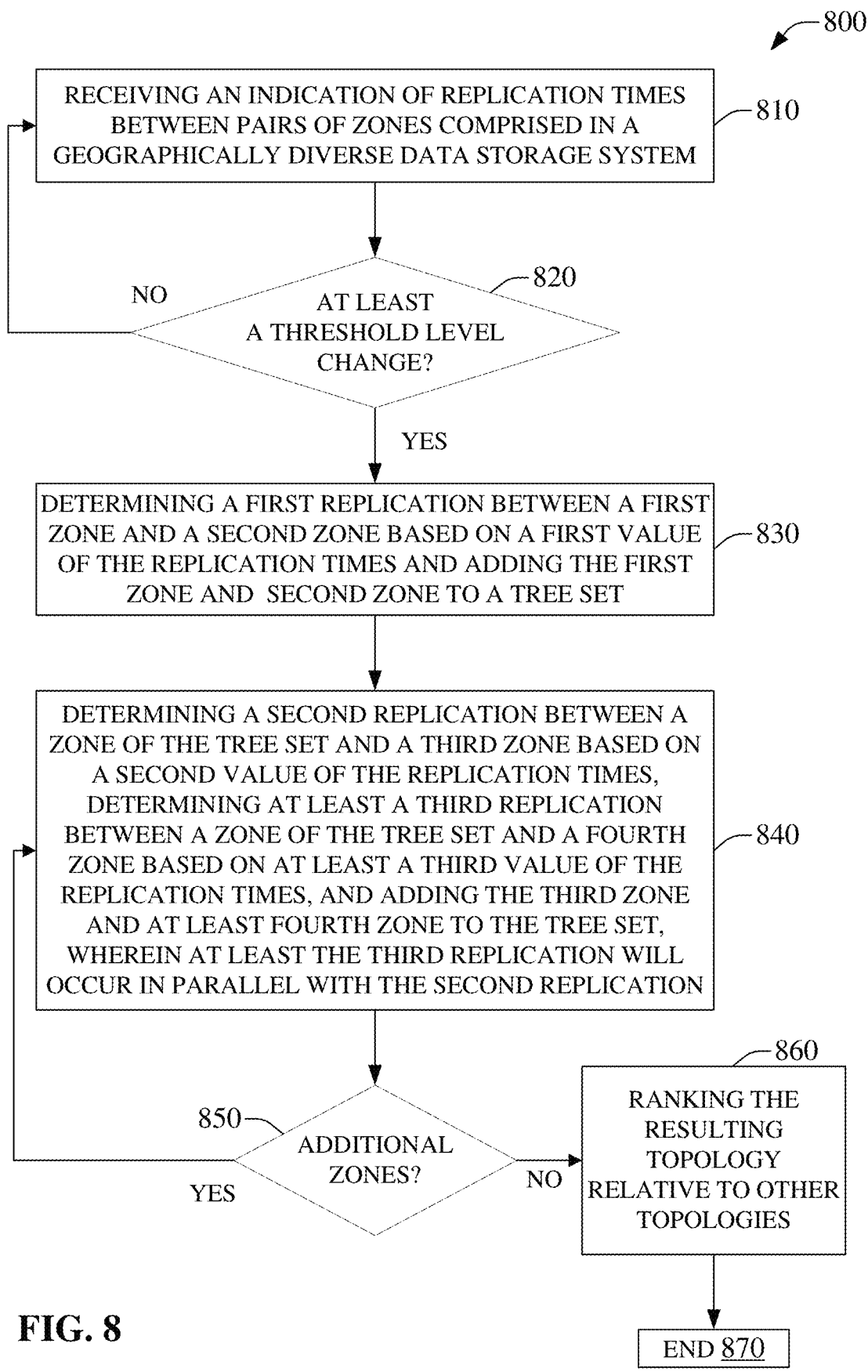
FIG. 8 illustrates an example method that can enable determining and ranking a tree topology for storing replicated data in a geographically diverse storage system, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate determining a tree topology for storing replicated data in a geographically diverse storage system, in accordance with aspects of the subject disclosure. At 710, method 700 can comprise receiving an indication of replication times between pairs of zones comprised in a geographically diverse data storage system. The indication of replication times, in an embodiment, can be a weight value table, for example, table 400, 500, etc. The indication of replication times can indicate predicted times to replicate data between pairs of zones and can be based on historical data replication times, measurements of system parameters, inferences, etc. In some embodiments, the indication of replication times can reflect network conditions between zones.

In an aspect, the indication of replication times can enable selection, modification, adaptation, generation, etc., of a topology that can leverage the replication time information to design replication of data from a zone to other relevant zones in a manner that can be efficient, e.g., a tree topology can be more efficient than a star topology, a tree topology that allows parallel replication can be more efficient than a tree topology that doesn't allow parallel replication, e.g., system 406 can complete a full replication faster than system 404, which in turn can be faster than system 402, etc.

At 720, method 700 can comprise determining a first replication between a first zone and a second zone. The determining the first replication can be based on a first value of the replication times. As an example, the second zone can be selected to form the pair [first zone, second zone] based on the replication time between the first zone and the second zone being a fastest replication time among the replication times. As an example, in system 504, a first replication between zone C and zone A can be determined based on the replication times embodied in table 500 indicating that C→A is a fastest replication time. In some embodiments where more than one replication time is a fastest replication time, the selection of the second zone and determining the first replication can be arbitrarily selected from among the group of fastest replication times. In some embodiments where more than one replication time is a fastest replication time, the selection of the second zone and determining the first replication can be based on selecting a second zone that meets other criteria, for example keeping a tree short, etc. In some embodiments, other criteria can be employed in selecting the second zone as part of determining the first replication, such as, monetary cost of using a zone, location of a zone, etc. Moreover, at 720, the first and second zones can be added to a tree set. As an example, in system 504, zone C and A, can be added to the tree set [C, A].

At 730, method 700 can comprise determining a second replication between a zone of the tree set, for example [C, A], and a third zone. At this point, method 700 can end. In an aspect, the determining the second replication can be based on a second value of the replication times. As an example, the third zone can be selected to form the pair [first zone, third zone], [second zone, third zone], etc., based correspondingly on the replication time between the first zone and the third zone, between the second zone and the third zone, etc., being a fastest replication time among the replication times. As an example, in system 504, a second replication between zone C and zone B can be determined based on the replication times embodied in table 500 indicating that C→B is a fastest replication time between a zone in the tree set and a zone not yet in the tree set. As before, in some embodiments where more than one replication time is a fastest replication time, the selection of the third zone can be arbitrary or based on other criteria, such as keeping a tree short, etc.

In an embodiment, another iteration(s) of method 700 can be performed where replication to additional zones is indicated, although not illustrated for clarity and brevity. As an example, determining a third replication between a zone of the tree set, for example now [C, A, B], and a fourth zone can be performed based on a third value of the replication times. In this example, the fourth zone can be selected to form the pair [first zone, fourth zone], [second zone, fourth zone], [third zone, fourth zone], etc., based on the corresponding replication time. As an example, in system 504, a third replication between zone A and zone D can be determined based on the replication times embodied in table 500 indicating that A→D is a fastest replication time between a zone in the tree set, e.g., one of [C, A, B], and a zone not yet in the tree set, e.g., [D, E, F]. Again, in some embodiments where more than one replication time is a fastest replication time, the selection of the fourth zone can be arbitrary or based on other criteria, such as keeping a tree short, etc. Similarly, a further iteration can determine a fourth replication as C→E based on replication times embodied in table 500 indicating that C→E is a fastest replication time between a zone in the tree set, e.g., one of [C, A, B, D], and a zone not yet in the tree set, e.g., [E, F]. A further iteration can determine a fifth replication as E→F based on replication times embodied in table 500 indicating that E→F is a fastest replication time between a zone in the tree set, e.g., one of [C, A, B, D, E], and a zone not yet in the tree set, e.g., [F]. This can result in there being no relevant zones that have not been added to the tree set, which can be associated with determining a topology for replication of data among the relevant zones. This topology can be, in some embodiments ranked against other viable topologies, for example, to allow selection of a fastest topology to apply, a cheapest topology to apply, a most reliable topology to apply, a topology that meets customer requirements, etc.

FIG. 8 is an illustration of an example method 800, which can enable determining and ranking a tree topology for storing replicated data in a geographically diverse storage system, in accordance with aspects of the subject disclosure. At 810, method 800 can comprise receiving an indication of replication times between pairs of zones comprised in a geographically diverse data storage system. The indication of replication times, in an embodiment, can be a weight value table, for example, table 400, 500, etc. The indication of replication times can indicate predicted times to replicate data between pairs of zones and can be based on historical data replication times, measurements of system parameters, inferences, etc. In some embodiments, the indication of replication times can reflect network conditions between zones.

In an aspect, the indication of replication times can enable selection, modification, adaptation, generation, etc., of a topology that can leverage the replication time information to design replication of data from a zone to other relevant zones in a manner that can be efficient, e.g., a tree topology can be more efficient than a star topology, a tree topology that allows parallel replication can be more efficient than a tree topology that doesn't allow parallel replication, e.g., system 406 can complete a full replication faster than system 404, which in turn can be faster than system 402, etc. Method 800, at 820, can determine if the replication times traverse a threshold level. In an aspect, this can be understood to advance method 800 to 830 where there is sufficient predicted change in a current replication topology to incur the burden of advancing further in method 800. As an example, a minor change in a replication time can be insignificant enough that determining a new topology or adapting an existing topology should be performed, even where it might result in a slight improvement in further replication of data among the relevant zones. However, in this example, where the change traverses the threshold level, the further determining of a topology, e.g., according to method 700, 800, etc., can be warranted. In an aspect, the threshold level can be selectable. As an example, a threshold can be a 10% change in replication time between any pair of relevant zones of a geographically diverse data storage system, such that a change of 9% would not trigger advancing to block 830, and a change of 10% would trigger advancing to block 830. As can be observed, method 800 can continue to receive indications and check them against a threshold value, as indicated by the 'no' looping back to method 800 at 810.

At 830, method 800 can comprise determining a first replication between a first zone and a second zone. The determining the first replication can be based on a first value of the replication times. As an example, the second zone can be selected to form the pair [first zone, second zone] based on the replication time between the first zone and the second zone being a fastest replication time among the replication times. As an example, in system 504, a first replication between zone C and zone A can be determined based on the replication times embodied in table 500 indicating that C→A is a fastest replication time. In some embodiments where more than one replication time is a fastest replication time, the selection of the second zone and determining the first replication can be arbitrarily selected from among the group of fastest replication times. In some embodiments where more than one replication time is a fastest replication time, the selection of the second zone and determining the first replication can be based on selecting a second zone that meets other criteria, for example keeping a tree short, etc. In some embodiments, other criteria can be employed in selecting the second zone as part of determining the first replication, such as, monetary cost of using a zone, location of a zone, etc. Moreover, at 830, the first and second zones can be added to a tree set. As an example, in system 506, zone C and A, can be added to the tree set [C, A].

At 840, method 800 can comprise determining a second replication between a zone of the tree set, for example [C, A], and a third zone and determining a third replication between a zone of the tree set and a fourth zone. In an aspect, the determining the second replication can be based on a second value of the replication times and the determining the third replication can be based on a third value of the replication times. As an example, the third zone can be selected to form the pair [first zone, third zone], [second zone, third zone], etc., based correspondingly on the replication time between the first zone and the third zone, between the second zone and the third zone, etc., being a fastest replication time among the replication times. Moreover in this example, the fourth zone can be selected to form the pair [first zone, fourth zone], [second zone, fourth zone], etc., again based on the replication times. In an aspect, the second and the third replication can occur contemporaneously, e.g., in parallel, which can be distinct from method 700 that can determine replications without parallel replication operations. As an example, in system 506, a second replication between zone A and zone B and a third replication between zone C and zone E can be determined to occur contemporaneously based on the replication times embodied in table 500 indicating that A→B is a fastest replication time between a zone in the tree set and a zone not yet in the tree set and C→E is a next fastest replication time between a zone in the tree set and a zone, other than the one selected for the second replication, e.g., zone B, not yet in the tree set. As before, in some embodiments where more than one replication time is a fastest replication time, the selection of the third/fourth zone(s) can be arbitrary or based on other criteria, such as keeping a tree short, etc.

At 850, method 800 can comprise determining if additional zones are to be replicated into. Where additional relevant zones are present outside of the tree set, e.g., which in the above example can now be [C, A, B, E], method 800 can return to 840 to determine at least a fifth replication. As an example, method 800, as applied to system 506, can next determine a fifth replication A→D and a sixth replication E→F according to 840, which can cause the tree set to be [C, A, B, E, F, D] with no other relevant zones not already being in the tree set. The full tree set can be associated with having completed determining of a topology for replication of data among the relevant zones. And 850 can return 'no' causing method 800 to advance to 860.

At 860, method 800 can comprise ranking the determined topology against other viable topologies. In an aspect, this can enable selection of a viable topology from among different viable topologies. As examples, the ranking can facilitate selection of a fastest topology, a cheapest topology, a most reliable topology, a topology that meets customer requirements, etc. Method 800 can then advance to 870 where method 800 can end.

Figure 9:
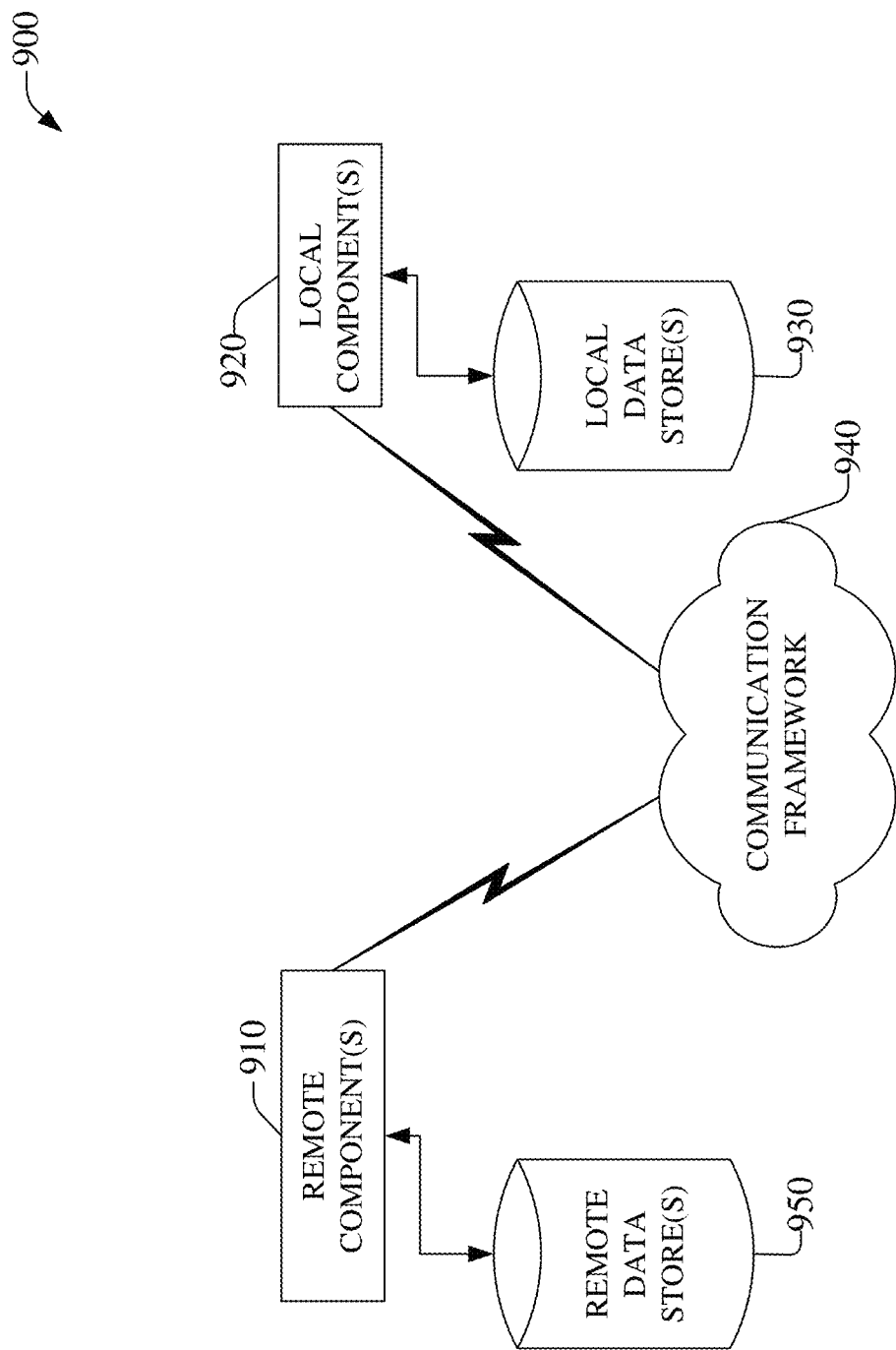
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in one or more of ZSC 110-130, TCC 108-138, etc., or other components of systems 100, 200, 202, 303-307, 402-406, 502-506, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate protection via hierarchical erasure coding and multistep recovery, as disclosed herein.

Figure 10:
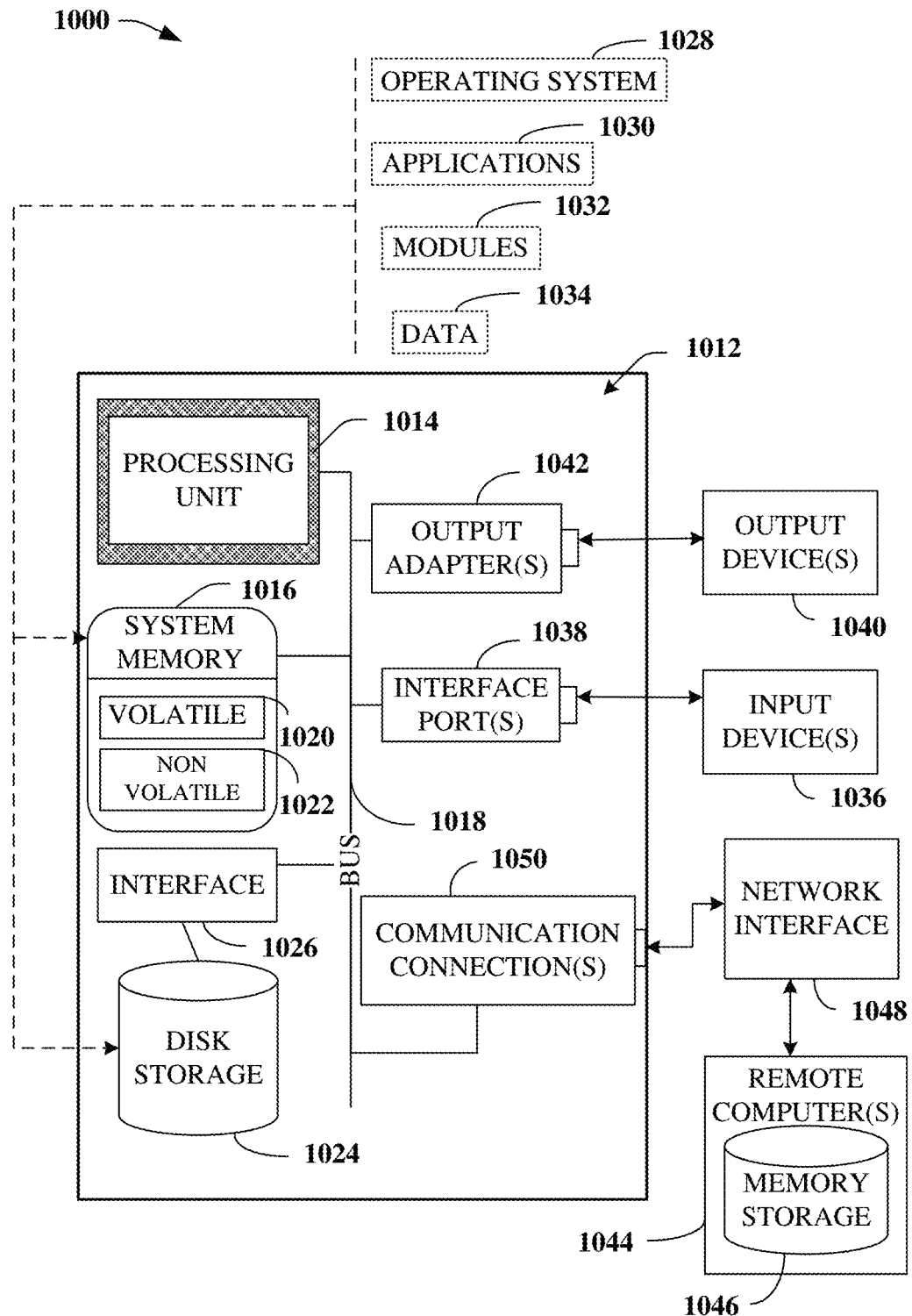
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of ZSC 110-130, TCC 108-138, etc., or other components of systems 100, 200, 202, 303-307, 402-406, 502-506, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to iteratively perform operations comprising determining that an indication of replication times satisfies a rule related to a threshold value and determining a first replication operation between a first zone and a second zone based on a first value of the replication times. The operations can further comprise determining a second replication operation between a zone of the tree set and a third zone based on a second value of the replication times. Accordingly, a resulting topological scheme can be applied, based on a ranking of the resulting topological scheme among the viable topological schema, to generate a protection set via replication of data among zones comprised in a tree set based on replication operations comprised in the resulting topological scheme.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A system, comprising:
a processor; and
a memory that stores executable instructions that, when executed by the processor, facilitate performance of operations, comprising:

receiving an indication of replication times between pairs of zones comprised in a geographically diverse data storage system comprising a first zone, a second zone, and a third zone;

determining a first replication operation between the first zone and the second zone based on a first value of the replication times and adding the first zone and the second zone to a tree set;

determining a second replication operation between a zone of the tree set and the third zone based on a second value of the replication times and adding the third zone to the tree set;

selecting a preferred replication topology based on a ranking of the first replication operation and the second replication operation among other replication operations determined for the pairs of zones from the replication times, wherein the ranking is based on a monetary cost of replication, a speed of replication, a reliability of replication, and satisfaction of a customer requirement for replication of a data chunk between the pairs of zones, wherein the data chunk comprises data stored in an append-only format according to an order in which the data was received by the geographically diverse data storage system, and wherein the data chunk is sealed prior to replication, causing the data chunk to be immutable; and replicating the data chunk among the pairs of zones according to the preferred replication topology, resulting in a replicated data chunk.

2. The system of claim 1, wherein the first zone is located remotely from the second zone, and wherein the first zone is located remotely from the third zone.

3. The system of claim 1, wherein the second zone is located remotely from the third zone.

4. The system of claim 1, wherein the ranking is based, at least in part, on determining the first value of the replication times is lower than another value of the replication times.

5. The system of claim 1, wherein the ranking is based, at least in part, on determining the first value of the replication times is the same as another value of the replication times, and is further based, at least in part, on determining that employing a zone corresponding to the first value results in shorter tree topology than employing another zone corresponding to the other value of the replication times.

6. The system of claim 1, wherein the ranking is in response to a determining that a characteristic of the geographically diverse data storage system has transitioned a threshold value.

7. The system of claim 6, wherein the threshold value is a replication time value of the replication times.

8. The system of claim 6, wherein the threshold value is an amount of change in a replication time value of the replication times.

9. The system of claim 1, wherein the operations further comprise iteratively determining another replication operation of the other replication operations, and wherein the other replication operation is between a zone of the tree set and another zone of the geographically diverse data storage system based on another value of the replication times and adding the other zone to the tree set.

10. The system of claim 1, wherein the ranking of the replication operations excludes unavailable topology schemes.

11. The system of claim 1, wherein the replicating the data chunk according to the preferred replication topology results in generating a protection set via replication of data chunks comprising the data chunk among zones comprised in the tree set.

12. The system of claim 9, wherein the iteratively determining another replication operation between a zone of the tree set and another zone results in a third replication operation that occurs in parallel with the second replication operation.

13. A method, comprising:
performing, by a system comprising a processor, a first iteration of operations comprising:
in response to receiving, by the system, an indication of replication times between a pair of zones comprised in a geographically diverse data storage system comprising a first zone, a second zone, and a third zone, determining a first replication operation between the first zone and the second zone based on a first value of the replication times and adding the first zone and the second zone to a tree set;

determining, by the system, a second replication operation between a zone of the tree set and the third zone based on a second value of the replication times and adding the third zone to the tree set;

selecting, by the system, a preferred replication topology based on ranking viable replication topologies, wherein the ranking the viable replication topologies is based, at least in part, on the replication times, a monetary cost of replication, a reliability of replication, and satisfaction of a customer requirement for replicating a data chunk between pairs of zones, and wherein the preferred replication topology comprises the first replication operation and the second replication operation; and initiating, by the system, a replication of the data chunk in accord with the preferred replication topology, wherein the data chunk comprises data stored in an append-only format according to an order in which the data was received by the geographically diverse data storage system, and wherein the data chunk becomes immutable by sealing the data chunk prior to performing the replication.

14. The method of claim 13, wherein the operations further comprise:
in response to determining, by the system, that there is a relevant zone of the geographically diverse data storage system to be added to the tree set, iteratively determining at least another replication operation between a zone of the tree set and at least another zone of the geographically diverse data storage system based on at least another value of the replication times and adding at least the other zone to the tree set, resulting in in topology scheme of the viable topology schemes.

15. The method of claim 14, wherein the iteratively determining at least the other replication operation results in a third replication operation that occurs in parallel with the second replication operation.

16. The method of claim 13, wherein the determining the first replication operation results in the first replication operation being between remotely located zones.

17. A non-transitory machine-readable storage medium, comprising executable instructions that, when executed by a processor, facilitate performance of operations, comprising:
determining that an indication of replication times between a pair of zones comprised in a geographically diverse data storage system comprising a first zone, a second zone, and a third zone, satisfies a rule related to a threshold value;

determining a first replication operation between the first zone and the second zone based on a first value of the replication times and adding the first zone and the second zone to a tree set;

determining a second replication operation between a zone of the tree set and the third zone based on a second value of the replication times and adding the third zone to the tree set;

ranking viable replication topologies, wherein the ranking the viable replication topologies is based, at least in part, on the replication times, a monetary cost of replications, a reliability of replications, and satisfaction of a customer requirement for replicating a data chunk between pairs of zones, and wherein a selected replication topology, selected from the viable replication topologies, comprises the first replication operation and the second replication operation; and applying the selected replication topology, resulting in generating a protection set via replication of the data chunk among zones comprised in the tree set based on replication operations comprised in the selected replication topology, wherein the data chunk comprises data stored in an append-only format according to an order in which the data was received by the geographically diverse data storage system, and wherein the data chunk is sealed prior to replication, thereby causing the data chunk to be immutable.

18. The non-transitory machine-readable storage medium of claim 17, wherein the operations further comprise:

iteratively determining at least another replication operation between a zone of the tree set and at least another zone of the geographically diverse data storage system based on at least another value of the replication times and adding at least the other zone to the tree set.

19. The non-transitory machine-readable storage medium of claim 18, wherein the iteratively determining at least the other replication operation results in a third replication operation that occurs in parallel with the second replication operation.

20. The non-transitory machine-readable storage medium of claim 17, wherein the first zone is remotely located from the second zone.

* * * * *